(12) United States Patent
Ochiishi et al.

(10) Patent No.: US 10,527,071 B2
(45) Date of Patent: Jan. 7, 2020

(54) FLUID CONTROL APPARATUS AND METHOD FOR ATTACHING AND DETACHING GAS LINE SECTION

(71) Applicants: FUJIKIN INCORPORATED, Osaka-shi, Osaka (JP); KOKUSAI ELECTRIC CORPORATION, Tokyo (JP)

(72) Inventors: Masahiko Ochiishi, Osaka (JP); Takahiro Matsuda, Osaka (JP); Hiroshi Unami, Toyama (JP); Yuji Saiki, Toyama (JP)

(73) Assignees: FUJIKIN INCORPORATED, Osaka (JP); KOKUSAI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/047,482

(22) Filed: Jul. 27, 2018

(65) Prior Publication Data

US 2018/0372130 A1 Dec. 27, 2018

Related U.S. Application Data

(63) Continuation of application No. PCT/JP2017/001855, filed on Jan. 20, 2017.

(30) Foreign Application Priority Data

Jan. 28, 2016 (JP) .................................. 2016-014917

(51) Int. Cl.
*F16L 3/00* (2006.01)
*F15B 13/08* (2006.01)
(Continued)

(52) U.S. Cl.
CPC ........ *F15B 13/0825* (2013.01); *F16B 5/0225* (2013.01); *F16L 3/22* (2013.01)

(58) Field of Classification Search
CPC ........ F16L 3/22; F15B 13/0825; F16B 5/0225
(Continued)

(56) References Cited

U.S. PATENT DOCUMENTS

2014/0239130 A1* 8/2014 Shikata ..................... F17D 1/04
248/68.1

FOREIGN PATENT DOCUMENTS

JP S61-191959 U 11/1986
JP 2012-241823 A 12/2012

OTHER PUBLICATIONS

Mar. 14, 2017 International Search Report issued in International Patent Application No. PCT/JP2017/001855.

* cited by examiner

*Primary Examiner* — Todd M Epps
(74) *Attorney, Agent, or Firm* — Cantor Colburn LLP

(57) ABSTRACT

A fluid control apparatus includes a gas line unit detachably attached to a frame. The gas line unit includes a line support member to which a fluid control device is attached. The frame includes: a first horizontal frame member; and a second horizontal frame member located below the first horizontal frame member. The first horizontal frame member includes: a hooking member extending in a left-right direction; and a lower portion which is located below the hooking member and in which a plurality of first grooves that are open to front are formed. The line support member includes: a device placement portion; and a pair of side plate portions protruding rearward from right and left edges of the device placement portion. Each of the side plate portions includes: a base portion located below the hooking member; and an upper portion located above the base portion and behind the hooking member.

7 Claims, 9 Drawing Sheets

(51) Int. Cl.
*F16L 3/22* (2006.01)
*F16B 5/02* (2006.01)

(58) Field of Classification Search
USPC .......................................... 248/68.1; 137/343
See application file for complete search history.

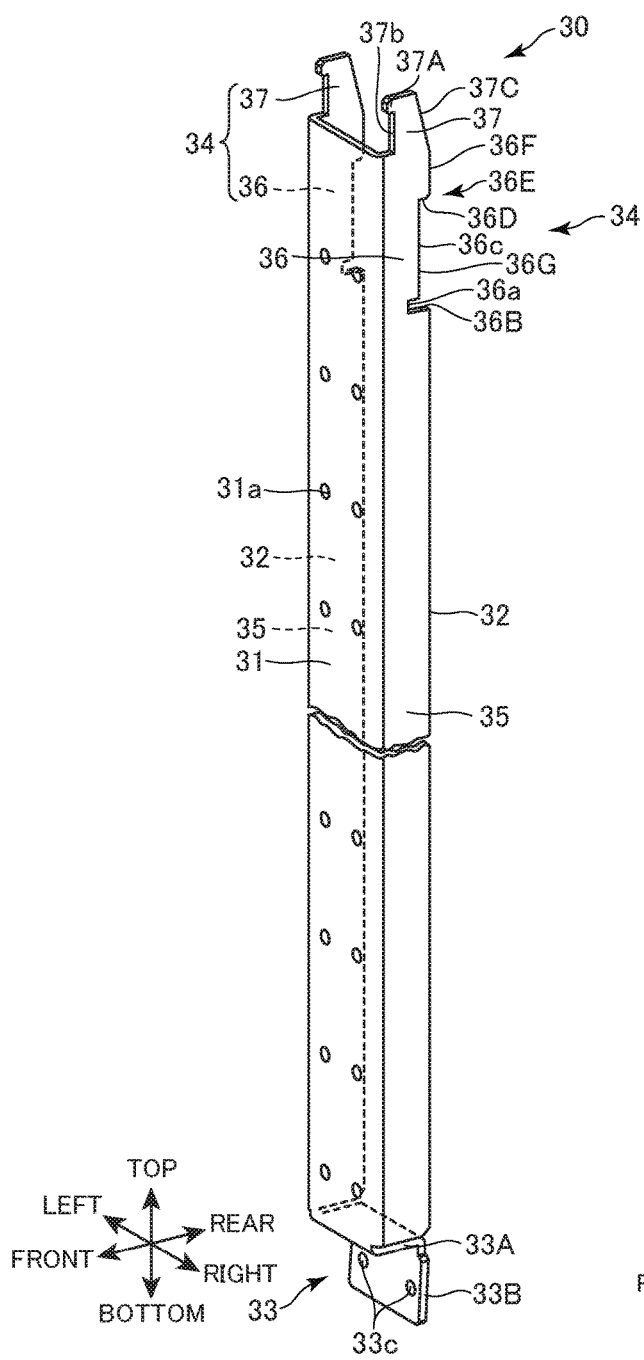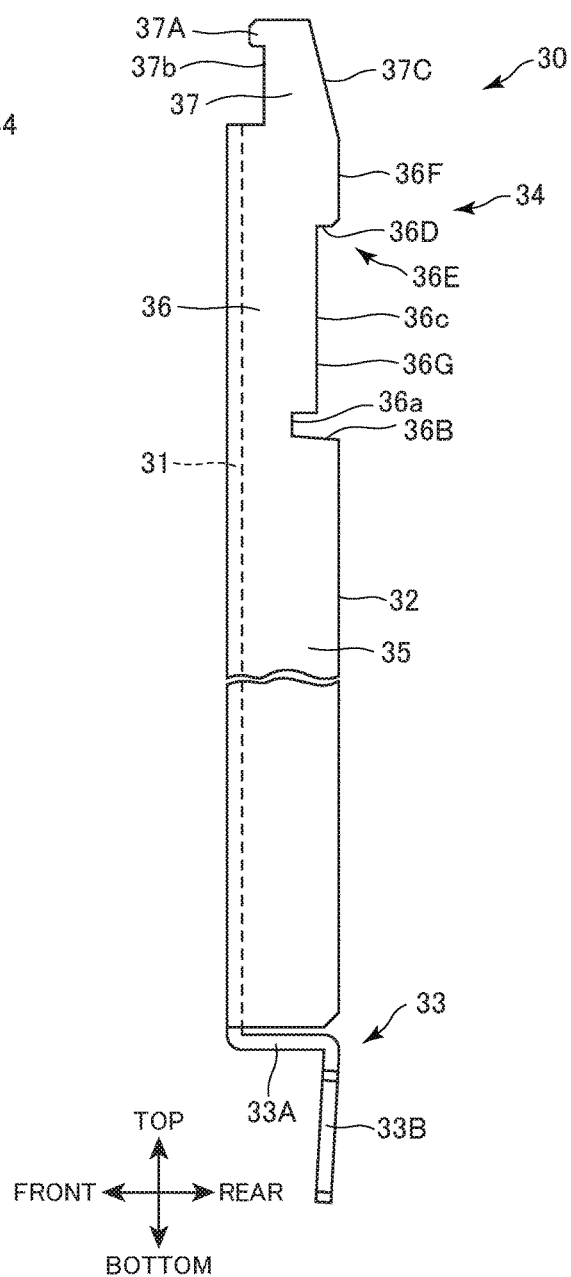

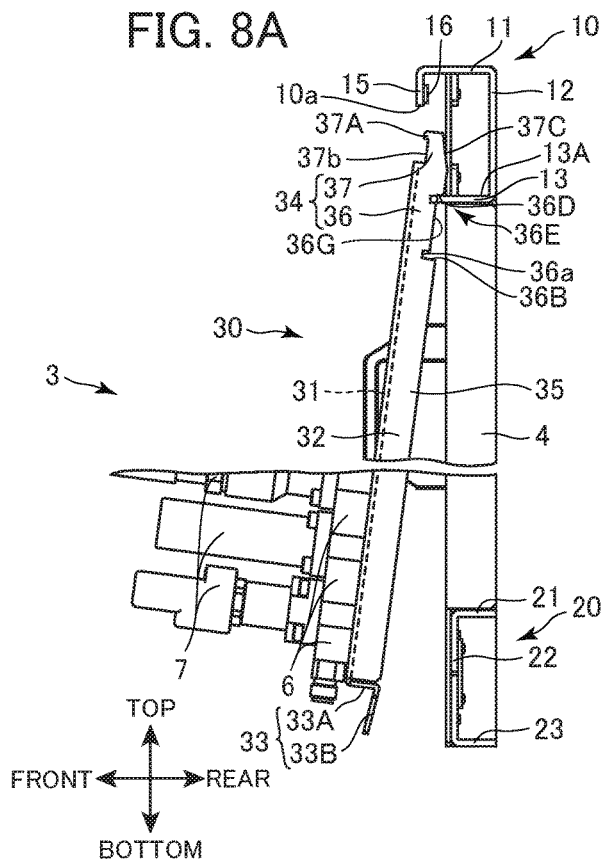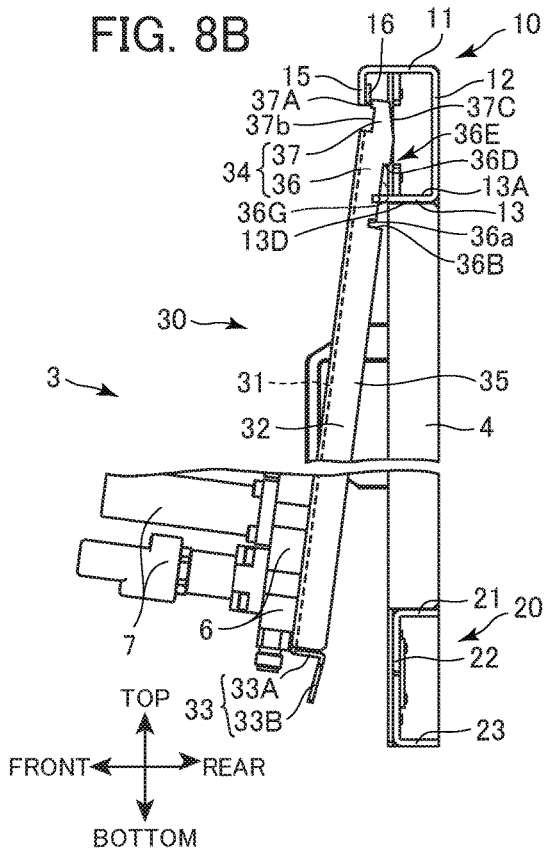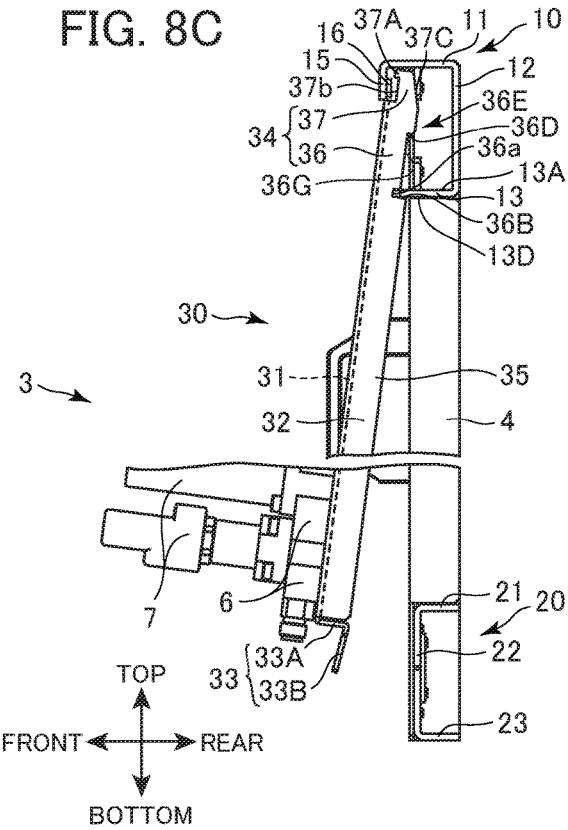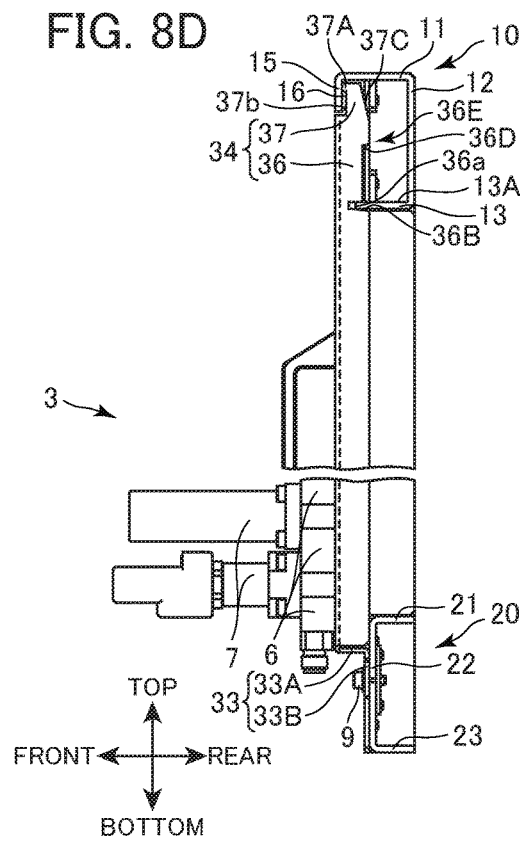

FLUID CONTROL APPARATUS AND METHOD FOR ATTACHING AND DETACHING GAS LINE SECTION

CROSS REFERENCE TO RELATED APPLICATION

This application is a continuation application of International Application No. PCT/JP2017/001855, filed Jan. 20, 2017, which claims priority to Japanese Patent Application No. 2016-014917, filed Jan. 28, 2016. The contents of these applications are incorporated herein by reference in their entirety.

BACKGROUND

The present disclosure relates to a fluid control apparatus used for a semiconductor manufacturing apparatus and the like, and a method for attaching and detaching gas line unit.

Conventionally, a fluid control apparatus to be fixed to a vertical wall surface of a casing of a semiconductor manufacturing apparatus has been proposed (see, for example, Japanese Patent Application Publication No. 2012-241823). A line holding member of each gas line unit is configured such that a hook-shaped upper end portion thereof is hooked to a cutout of an upper horizontal frame member, a lower end portion of the line holding member is fitted into a slit of a lower horizontal frame member, and an upper cover and a lower cover are fixed to the upper horizontal frame member and the lower horizontal frame member with bolts, thereby fixing the upper end portion and the lower end portion of the line holding member to the upper horizontal frame member and the lower horizontal frame member.

SUMMARY

In the fluid control apparatus in Japanese Patent Application Publication No. 2012-241823, however, when the line holding member is attached or detached, the upper cover and the lower cover need to be removed, and it is difficult to detach the upper cover because there is no so much space on the upper side of the upper cover due to other devices. Further, in attaching and detaching the line holding member to and from the upper horizontal frame member, the upper end portion of the line holding member needs to be passed through the upper side of the upper horizontal frame once. However, it is difficult to attach and detach the line holding member because there is no so much space on the upper side of the upper cover. The line holding member is fixed with bolts, and hence the work efficiency is low.

It is therefore an object of the present disclosure to provide a fluid control apparatus and a method for attaching and detaching a gas line unit, which are capable of mounting a gas line unit to a frame efficiently and easily.

A fluid control apparatus in accordance with one or more embodiments includes a gas line unit detachably attached to a frame. The gas line unit includes a line support member to which a fluid control device is attached. The frame includes: a first horizontal frame member; and a second horizontal frame member located below the first horizontal frame member. The first horizontal frame member includes: a hooking member extending in a left-right direction; and a lower portion which is located below the hooking member and in which a plurality of first grooves that are open to front are formed. The line support member includes: a device placement portion; and a pair of side plate portions protruding rearward from right and left edges of the device placement portion. Each of the side plate portions includes: a base portion located below the hooking member; and an upper portion located above the base portion and behind the hooking member. A second groove that is open to rear and fitted into the first groove is formed in the base portion. The upper portion is provided with a projecting portion that protrudes frontward and abuts on the hooking member from above.

A method for attaching and detaching a gas line unit to and from a frame in accordance with one or more embodiments, the frame including: a first horizontal frame member; and a second horizontal frame member located below the first horizontal frame member, the first horizontal frame member including: a hooking member extending in a left-right direction; and a lower portion which is located below the hooking member and in which a plurality of first grooves that are open to front are formed, the gas line unit including a line support member including: a device placement portion to which a fluid control device is attached; and a pair of side plate portions protruding rearward from right and left edges of the device placement portion, each of the side plate portions including: a base portion; and an upper portion located above the base portion, a second groove that is open to rear being formed in the base portion, the upper portion being provided with a projecting portion that protrudes frontward, the method includes: fitting, in a state in which the gas line unit is inclined with respect to an up-down direction, the second groove of each of the base portions of the line support member into the first groove of the lower portion of the first horizontal frame member, and locating the upper portion at a position behind the hooking member; and rotating the gas line unit about the second groove such that the upper portion approaches the front, bringing the projecting portion of the upper portion into abutment on the hooking member of the first horizontal frame member from above, and hanging the gas line unit from the first horizontal frame member.

BRIEF DESCRIPTION OF THE DRAWINGS

FIG. 5A is a fragmentary perspective view of a line support member, and FIG. 5B is a fragmentary side view of the line support member;

FIGS. 8A to 8D are explanatory diagrams of a method for mounting a gas line unit to a frame.

DETAILED DESCRIPTION

A fluid control apparatus 1 and a method for attaching and detaching a gas line unit 3 according to some embodiments of the present disclosure are described with reference to the accompanying drawings. In the following description, an up-down direction, a left-right direction, and a front-rear direction are defined as illustrated in FIG. 1.

Figure 1:
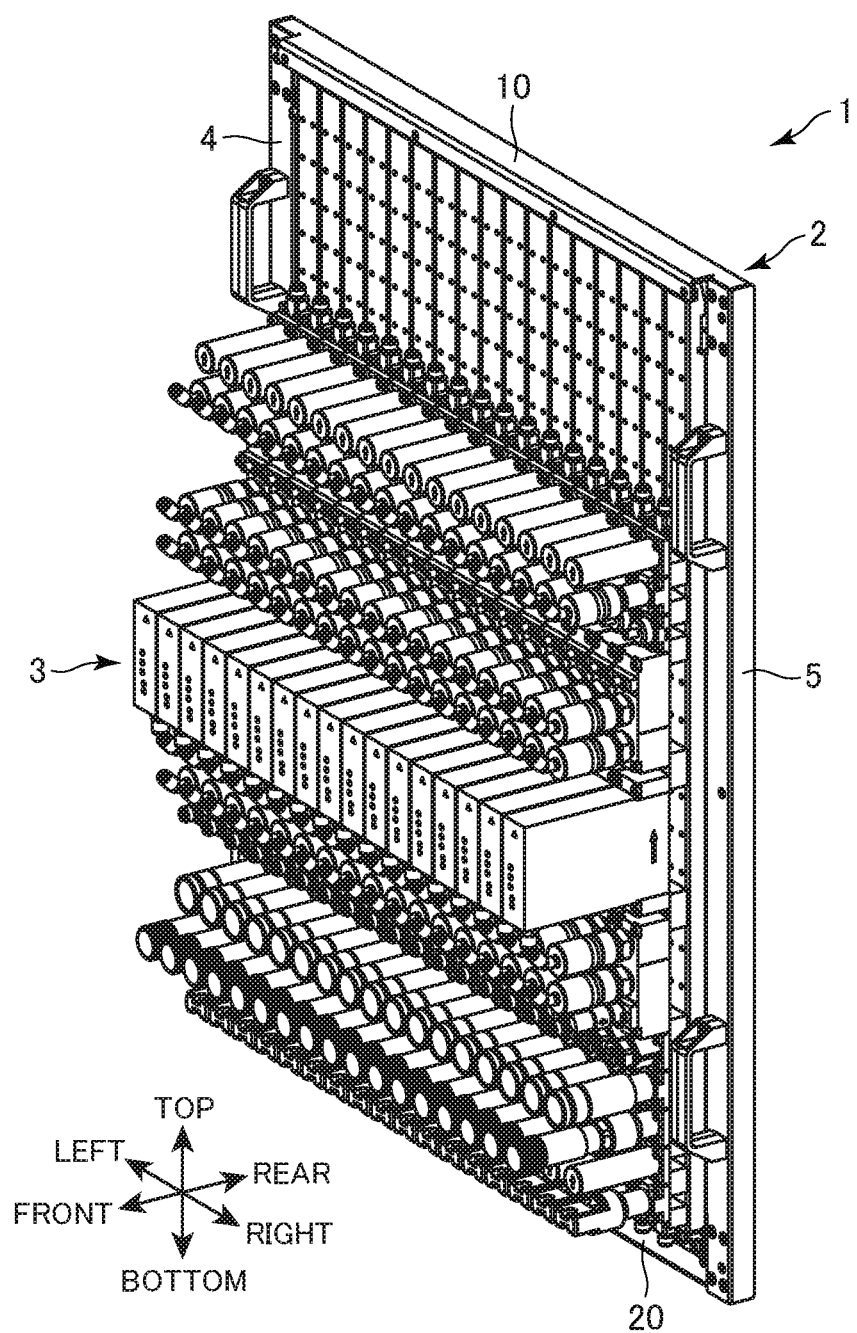
FIG. 1 is a perspective view of a fluid control apparatus according to the present embodiment.
Figure 2:
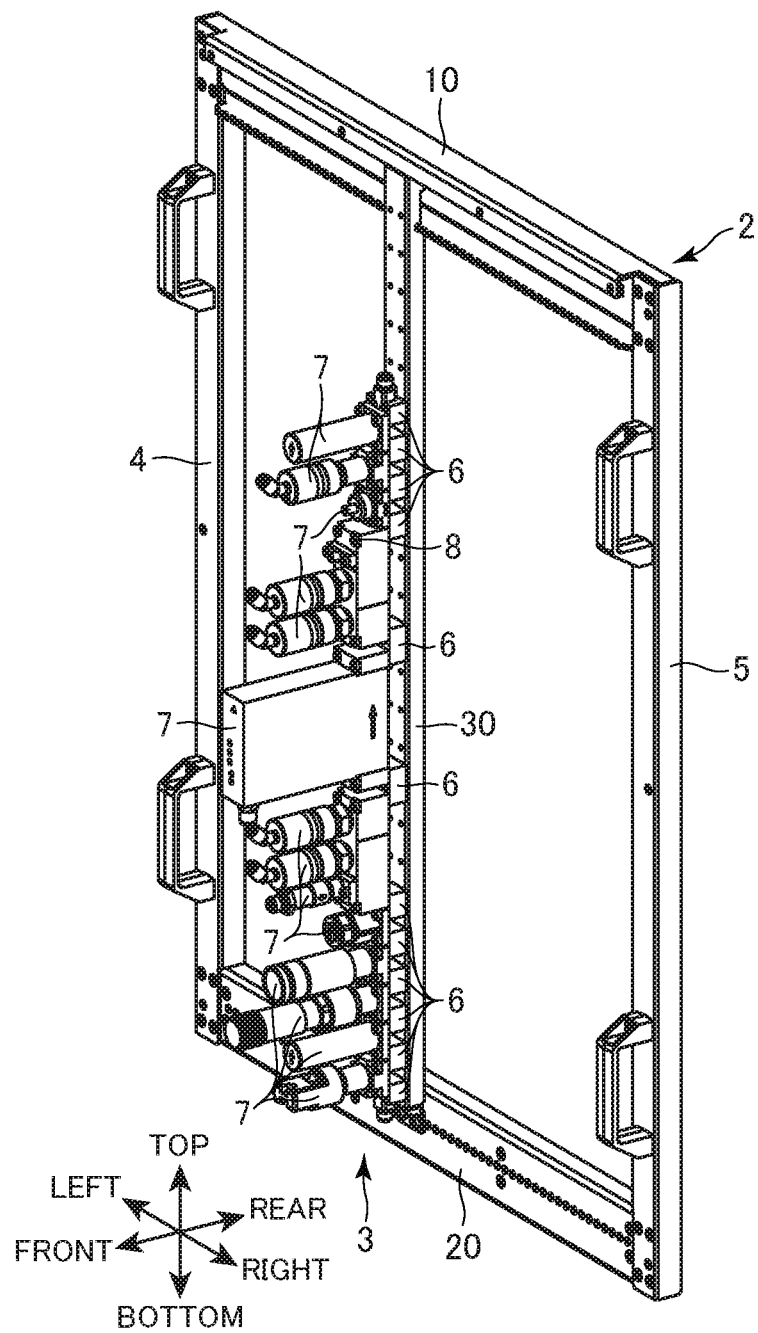
FIG. 2 is a diagram illustrating a state in which one gas line unit is mounted to a frame.

FIG. 1 is a perspective view of the fluid control apparatus 1 according to the present embodiment. FIG. 2 is a diagram illustrating a state in which one gas line unit 3 is mounted to a frame 2.

As illustrated in FIG. 1, the fluid control apparatus 1 includes the frame 2 and a plurality of gas line units 3 (only one gas line unit 3 is denoted by reference number for simple illustration).

For example, the frame 2 is fixed to a vertical wall surface of a casing of a semiconductor manufacturing apparatus. The frame 2 has a rectangular frame shape, and includes a first horizontal frame member 10, a second horizontal frame member 20, a first vertical frame member 4, and a second vertical frame member 5. The second horizontal frame member 20 is parallel to the first horizontal frame member 10, and is located below the first horizontal frame member 10. The first vertical frame member 4 and the second vertical frame member 5 are orthogonal to the first horizontal frame member 10 and the second horizontal frame member 20, and are connected to respective end portions thereof. For example, each of the frame members 10, 20, 4, and 5 is made of stainless steel.

As illustrated in FIG. 2, each gas line unit 3 is supported by the first horizontal frame member 10 and the second horizontal frame member 20, and includes a line support member 30, a plurality of joints 6, and a plurality of fluid control devices 7. Each joint 6 is fixed to the line support member 30 with a bolt (not shown). The plurality of fluid control devices 7 are configured by automatic valves, manual valves, regulators, pressure gauges, and flow rate control devices (for example, MFCs (Mass Flow Controllers)) and the like, and are fixed to the joints 6 with bolts 8 (only one bolt 8 is denoted by reference number for simple illustration).

Figure 3A:
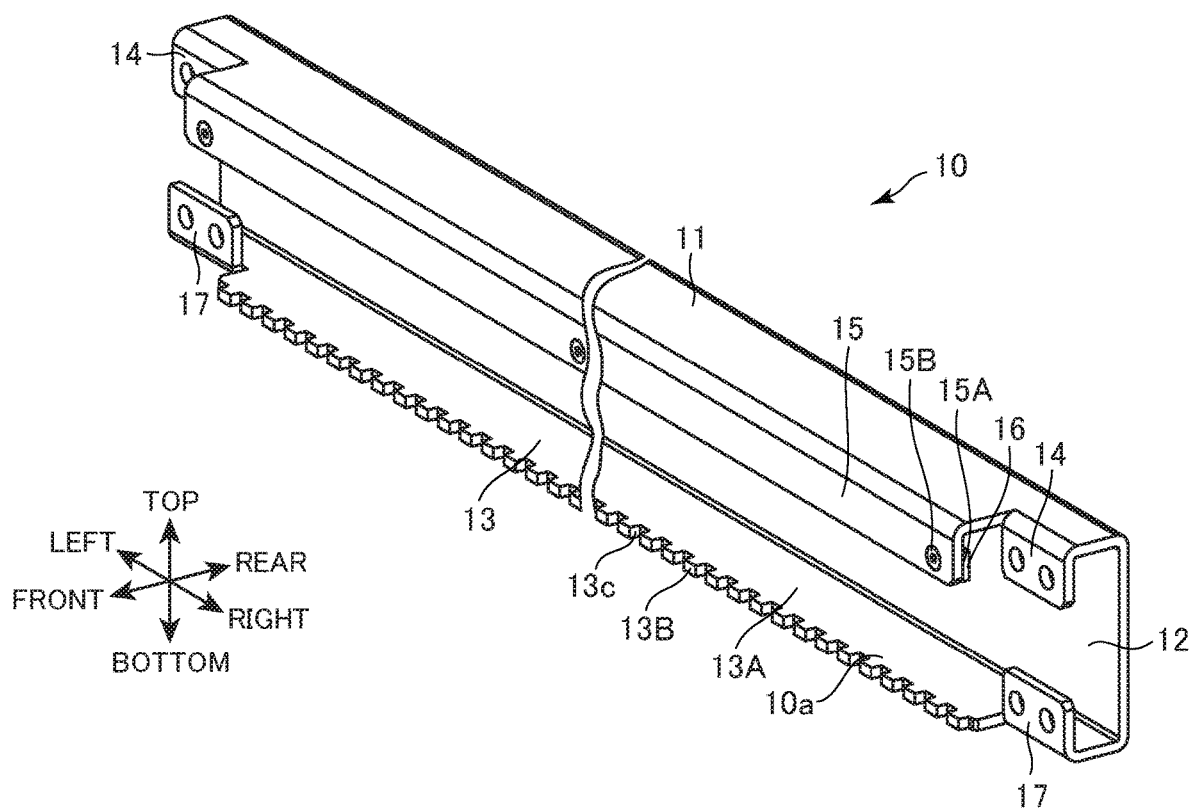
FIG. 3A is a fragmentary perspective view of a first horizontal frame member.

Next, the detailed structure of the first horizontal frame member 10 is described with reference to FIGS. 3A and 3B. FIG. 3A is a fragmentary perspective view of the first horizontal frame member 10, and FIG. 3B is a partially enlarged view of the first horizontal frame member 10.

Figure 3B:
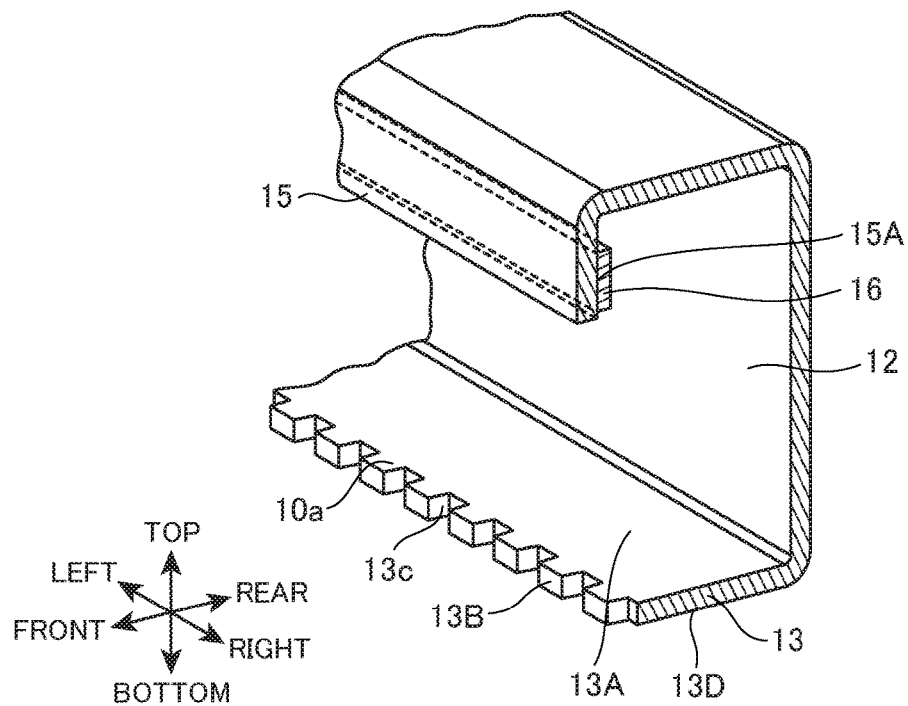
FIG. 3B is a partially enlarged view of the first horizontal frame member.

As illustrated in FIGS. 3A and 3B, the first horizontal frame member 10 is formed by folding sheet metal, and has a substantially C-shaped cross-section having an opening 10a to the front. The first horizontal frame member 10 includes a first upper portion 11, a first rear portion 12, and a first lower portion 13.

The first upper portion 11 has a flat plate shape extending in the left-right direction and orthogonal to the up-down direction. Mounting portions 14 for mounting the first and second vertical frame members 4 and 5 are provided at both ends of the first upper portion 11, respectively. A first front portion 15 protruding downward is provided at the front end of the first upper portion 11 located between the pair of mounting portions 14. A hooking member 16 extending over the entire length of the rear surface 15A of the first front portion 15 in the left-right direction is fixed to the rear surface 15A with bolts 15B.

The first rear portion 12 has a flat plate shape that protrudes downward from the rear end of the first upper portion 11, is orthogonal to the front-rear direction, and extends in the left-right direction.

The first lower portion 13 has a flat plate shape that protrudes frontward from the lower end of the first rear portion 12, extends in the left-right direction, and is orthogonal to the up-down direction. Mounting portions 17 for mounting the first and second vertical frame members 4 and 5 are provided at both ends of the first lower portion 13, respectively. The first lower portion 13 has a top surface 13A and a bottom surface 13D. At a front end portion 13B of the first lower portion 13, a plurality of first grooves 13c that are open to the front are formed (only one first groove 13c is denoted by reference number for simple illustration). Each first groove 13c is formed such that the width becomes smaller toward the rear.

Next, the detailed structure of the second horizontal frame member 20 is described with reference to FIG. 4.

Figure 4:
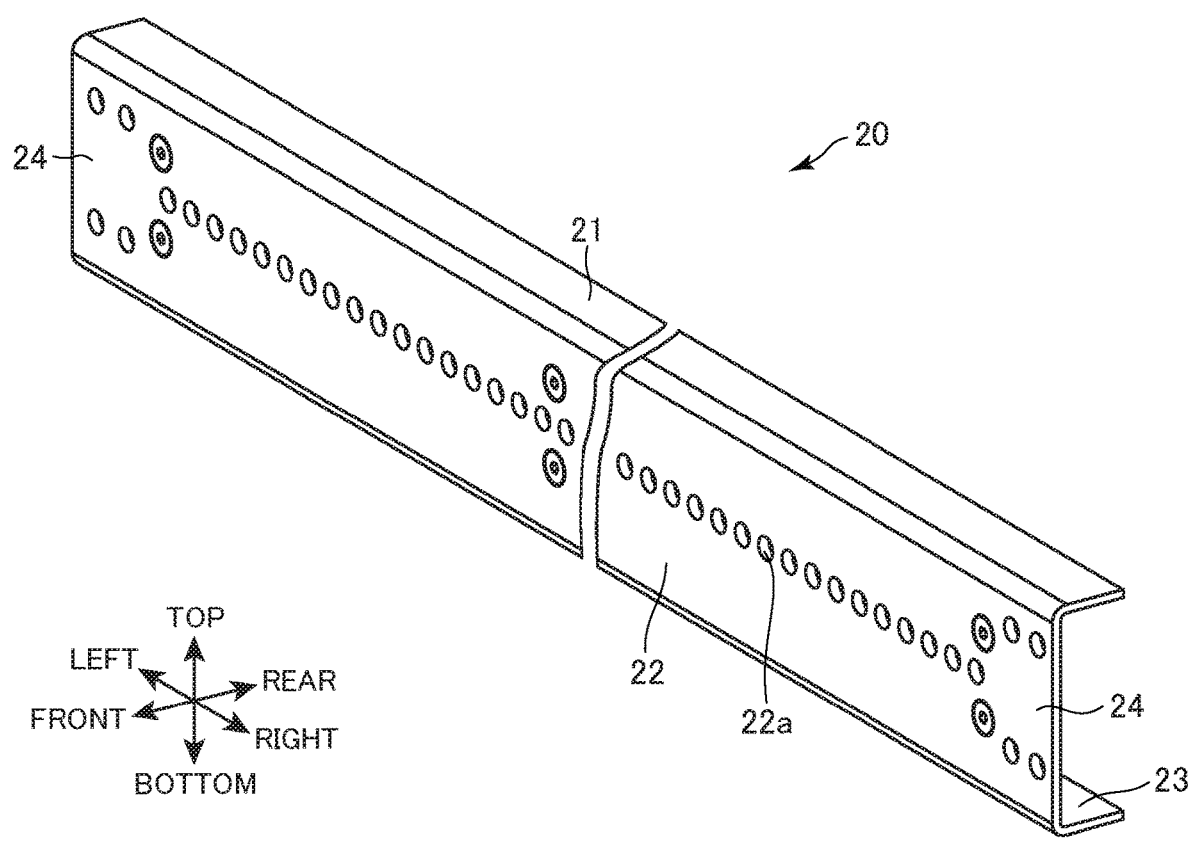
FIG. 4 is a fragmentary perspective view of a second horizontal frame member.

FIG. 4 is a fragmentary perspective view of the second horizontal frame member 20.

As illustrated in FIG. 4, the second horizontal frame member 20 is formed by folding sheet metal, and has a substantially inversed C-shaped cross-section having an opening to the rear. The second horizontal frame member 20 includes a second upper portion 21, a second front portion 22, and a second lower portion 23.

The second upper portion 21 has a flat plate shape extending in the left-right direction and orthogonal to the up-down direction. The second front portion 22 has a flat plate shape that protrudes downward from the front end of the second upper portion 21, extends in the left-right direction, and is orthogonal to the front-rear direction. Mounting portions 24 for mounting the first and second vertical frame members 4 and 5 are provided at both ends of the second front portion 22, respectively. A plurality of first fixation holes 22a (only one first fixation hole 22a is denoted by reference number for simple illustration) arranged in the left-right direction are formed between the pair of mounting portions 24 of the second front portion 22. The second lower portion 23 has a flat plate shape that protrudes rearward from the lower end of the second front portion 22, extends in the left-right direction, and is orthogonal to the up-down direction.

Next, the detailed structure of the line support member 30 is described with reference to FIGS. 5A and 5B.

FIG. 5A is a fragmentary perspective view of the line support member 30, and FIG. 5B is a fragmentary side view of the line support member 30.

For example, the line support member 30 is formed by folding a plate member made of stainless steel. The line support member 30 has a flat plate-shaped device placement portion 31 extending in the up-down direction, a pair of side plate portions 32 protruding rearward from right and left edges of the device placement portion 31, respectively, and a fixation portion 33 provided at the lower end of the device placement portion 31.

In the device placement portion 31, a plurality of joint holes 31a (only one joint hole 31a is denoted by reference number for simple illustration) to be screwed with bolts (not shown) for fixing the joints 6 are formed.

The pair of side plate portions 32 have the same shape. Each side plate portion 32 has a flat plate shape extending in the up-down direction, and has an engagement portion 34 and a plate-shaped portion 35 located under the engagement portion 34. When the line support member 30 is mounted to the frame 2, the engagement portion 34 is located above the first lower portion 13 of the first horizontal frame member 10.

The engagement portion 34 includes a base portion 36 protruding rearward directly from the right edge of the device placement portion 31, and upper portions 37 extending upward from the upper end of the base portion 36. The upper portions 37 are each provided with a projecting portion 37A protruding frontward from the upper end portion of the upper portion 37. The base portion 36, the upper portion 37, and the projecting portion 37A form a recess portion 37b that is open to the front. At the rear end of the upper portion 37, a first inclined surface 37C that is inclined so as to be away from the device placement portion 31 from the upper end thereof to the lower direction is formed.

A second groove 36a that is open to the rear is formed at the lower end of the base portion 36. A lower part of the second groove 36a is formed by a second inclined surface 36B that is inclined downward as being apart from the device placement portion 31. At the rear end of the base portion 36 and on the upper side of the second groove 36a, a cutout 36c is formed along the up-down direction. Because of the cutout 36c, a stepped portion 36E having a stepped surface 36D facing downward is formed at the rear end of the base portion 36. The rear end of the base portion 36 is formed from a first rear surface 36F extending downward from the lower end of the first inclined surface 37C, a second rear surface 36G located below and ahead of the first rear surface 36F and forming the cutout 36c, and the stepped surface 36D connecting the first rear surface 36F and the second rear surface 36G.

The fixation portion 33 includes a connection portion 33A connected to the lower end of the device placement portion 31 and protruding rearward, and a bolt fixation portion 33B protruding downward from the rear end of the connection portion 33A. The connection portion 33A is folded at a right angle with respect to the device placement portion 31. The bolt fixation portion 33B is inclined so as to approach the front as it goes downward. A pair of second fixation holes 33c for inserting the bolts 9 thereinto are formed in the bolt fixation portion 33B.

Next, the relation between the line support member 30 and the first horizontal frame member 10 and the second horizontal frame member 20 in the state in which the gas line unit 3 is mounted to the frame 2 is described with reference to FIGS. 6 and 7.

Figure 6:
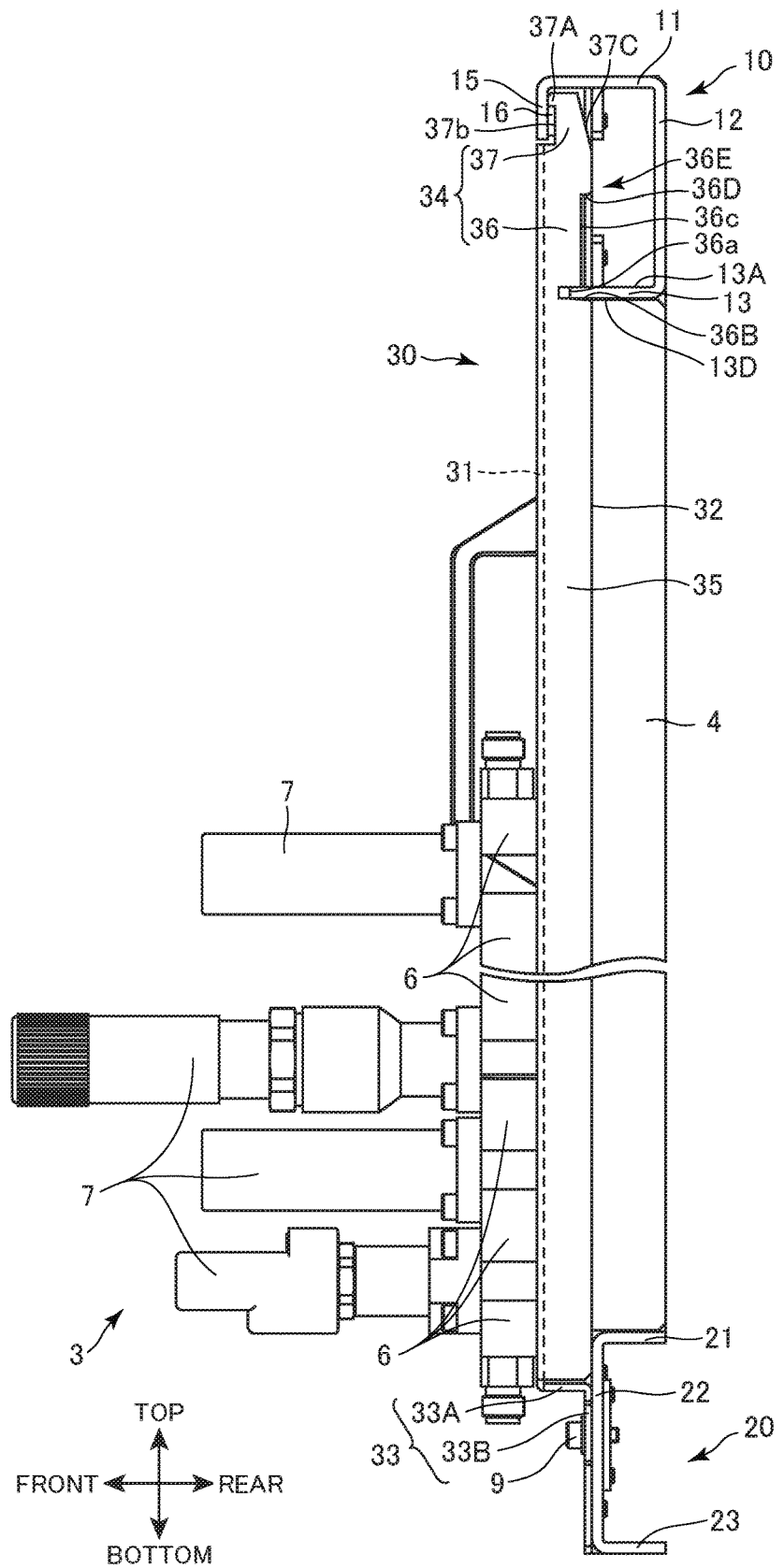
FIG. 6 is a fragmentary side view of a state in which the gas line unit is mounted to the first horizontal frame member and the second horizontal frame member.

FIG. 6 is a fragmentary side view of the state in which the gas line unit 3 is mounted to the first horizontal frame member 10 and the second horizontal frame member 20. FIG. 7 is an enlarged perspective view of the engagement portion 34 and the fixation portion 33 of the line support member 30 and their vicinities in the state in which the line support member 30 is mounted to the first horizontal frame member 10 and the second horizontal frame member 20.

Figure 7:
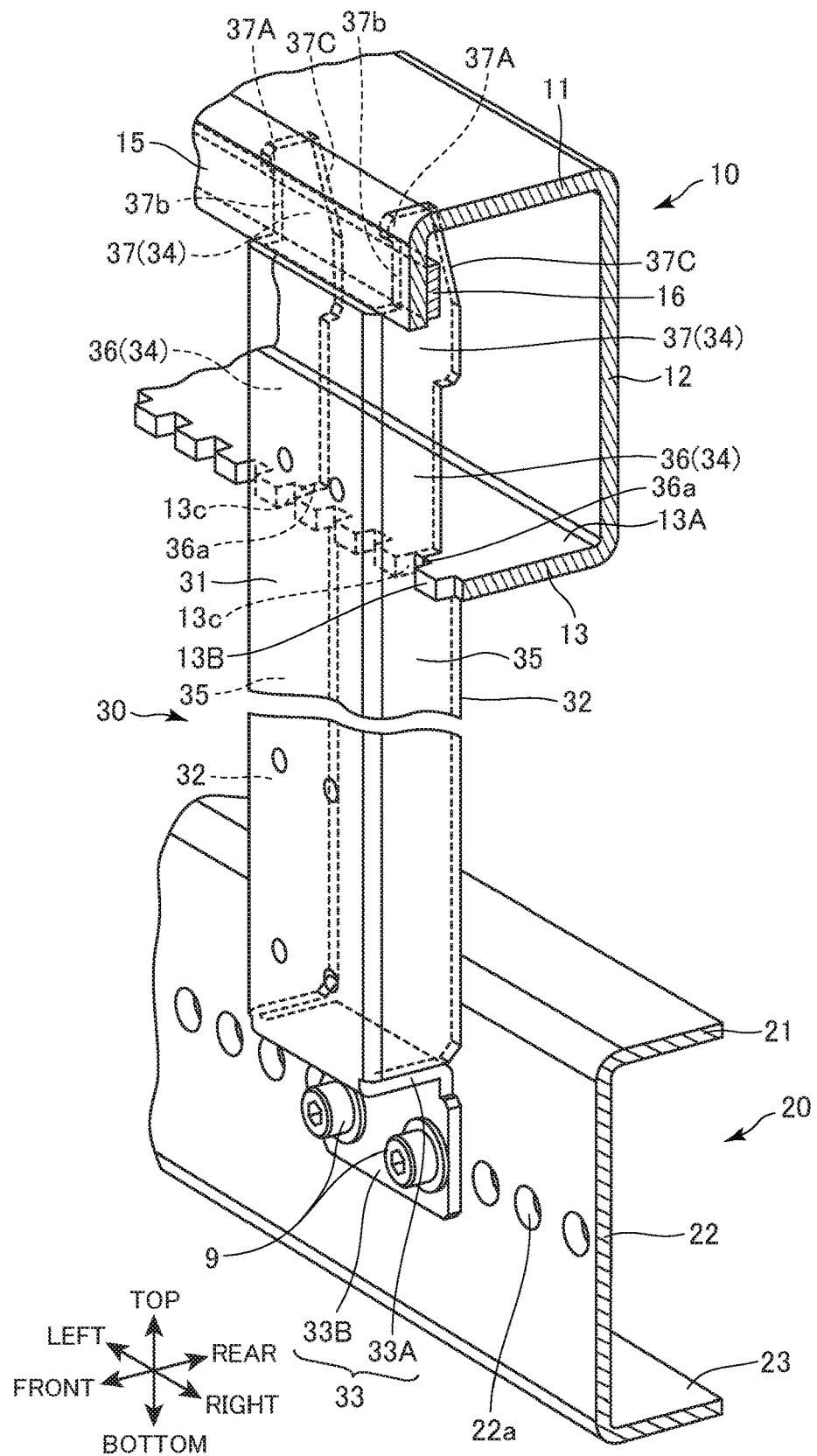
FIG. 7 is an enlarged perspective view of an engagement portion and a fixation portion of the line support member and their vicinities in a state in which the line support member is mounted to the first horizontal frame member and the second horizontal frame member.

As illustrated in FIGS. 6 and 7, in the state in which the gas line unit 3 is mounted to the first horizontal frame member 10 and the second horizontal frame member 20, each upper portion 37 of the line support member 30 is located behind the first front portion 15 of the first horizontal frame member 10. The projecting portion 37A of each upper portion 37 abuts on the hooking member 16 from the above, and the hooking member 16 is located in the recess portion 37b of the upper portion 37.

As illustrated in FIG. 7, the second groove 36a of each base portion 36 of the line support member 30 is fitted into the first groove 13c of the first lower portion 13 of the first horizontal frame member 10 from the front like a halving joint, and the gas line unit 3 is positioned with respect to the frame 2 in the left-right direction. The first groove 13c is formed to have a dimension that can accommodate two side plate portions 32, and the width thereof becomes smaller toward the rear (tapered part is formed). The distance between a pair of side plate portions 32 is formed such that the right side plate portion 32 contacts with the left tapered part of a corresponding first groove 13c and the left side plate portion 32 contacts with the right tapered part of a corresponding first groove 13c. Thus, when the second groove 36a of each base portion 36 of the line support member 30 is inserted deep, the gas line unit 3 is reliably positioned with respect to the frame 2.

The bolt 9 is inserted into each second fixation hole 33c of the bolt fixation portion 33B and the first fixation hole 22a of the second front portion 22, and the fixation portion 33 of the line support member 30 is fixed to the second horizontal frame member 20. As described above, the bolt fixation portion 33B is inclined so as to approach the front as it goes downward, and hence when the bolt fixation portion 33B is fixed with the bolts 9 so as to abut on the second front portion 22 of the second horizontal frame member 20, a force toward the front acts on the upper portions 37 of the line support member 30. In this manner, the upper portions 37 of the line support member 30 are pressed against the first front portion 15 of the first horizontal frame member 10.

Next, a method for attaching and detaching the gas line unit 3 is described with reference to FIGS. 8A to 8D.

FIGS. 8A to 8D are explanatory diagrams of a method for mounting the gas line unit 3 to the frame 2.

As illustrated in FIG. 8A, the gas line unit 3 is retained while being inclined with respect to the up-down direction, and a part of the engagement portion 34 of the gas line unit 3 is inserted in the first horizontal frame member 10 through the opening 10a. While the base portion 36 of the engagement portion 34 of each side plate portion 32 is inserted into the first groove 13c of the first lower portion 13 of the first horizontal frame member 10, the stepped surface 36D of each stepped portion 36E is placed on the top surface 13A of the first lower portion 13. In this manner, most of the weight of the gas line unit 3 is supported by the first horizontal frame member 10.

As illustrated in FIG. 8B, the second rear surface 36G of the base portion 36 of each engagement portion 34 is slid obliquely upward along the first groove 13c of the first lower portion 13. As illustrated in FIG. 8C, the gas line unit 3 is raised until the second inclined surface 36B of the base portion 36 of the engagement portion 34 abuts on the bottom surface 13D of the first lower portion 13.

Next, the second groove 36a of each base portion 36 of the line support member 30 is fitted into the first groove 13c of the first lower portion 13 of the first horizontal frame member 10, and the gas line unit 3 is rotated about the second groove 36a such that the fixation portion 33 approaches the second front portion 22. In this manner, the projecting portion 37A of each upper portion 37 of the line support member 30 abuts on the hooking member 16 provided on the first front portion 15 of the first horizontal frame member 10 from the above, and the hooking member 16 is located in the recess portion 37b of the upper portion 37. As a result, the gas line unit 3 is hanged from the first horizontal frame member 10.

The bolts 9 are inserted into each second fixation holes 33c of the bolt fixation portion 33B and the first fixation holes 22a of the second front portion 22, and the fixation portion 33 of the line support member 30 is fixed to the second horizontal frame member 20.

For detaching the gas line unit 3 from the frame 2, the procedure described with reference to FIGS. 8A to 8D is performed in the reverse order. Specifically, the bolts 9 are removed from the bolt fixation portion 33B of the fixation portion 33 and the second front portion 22 of the second horizontal frame member 20, and the gas line unit 3 is rotated about the second groove 36a such that the fixation portion 33 is away from the second front portion 22. The second groove 36a of each base portion 36 is detached from the first groove 13c of the first lower portion 13. The second rear surface 36G of each base portion 36 is slid along the first groove 13c of the first lower portion 13, and the gas line unit 3 is lowered until the stepped surface 36D of each stepped portion 36E abuts on the top surface 13A of the first lower portion 13. By separating each engagement portion 34 away from the first horizontal frame member 10, the gas line unit 3 is detached from the frame 2.

As described above, according to the fluid control apparatus 1 in the present embodiment, the line support member 30 extending in the up-down direction has the flat plate-shaped device placement portion 31 and the pair of side plate portions 32 protruding rearward from the right and left edges of the device placement portion 31, respectively. Each side plate portion 32 has the base portion 36 located below the hooking member 16, and the upper portion 37 located above the base portion 36 and behind the hooking member 16. In the base portion 36, the second groove 36a that is open to the rear and is fitted into the first groove 13c of the first horizontal frame member 10 is formed. The upper portion 37 is provided with the projecting portion 37A that protrudes frontward and abuts on the hooking member 16 from the above.

With this configuration, by fitting the second groove 36a of each base portion 36 of the line support member 30 into the first groove 13c of the first lower portion 13 of the first horizontal frame member 10, locating the upper portion 37 behind the hooking member 16, rotating the gas line unit 3 about the second groove 36a such that the upper portion 37 approaches the front, and bringing the projecting portion 37A of the upper portion 37 into abutment on the hooking member 16 of the first horizontal frame member 10 from the above, the gas line unit 3 can be hanged from the first horizontal frame member 10. Thus, even when there is no space above the first horizontal frame member 10, the gas line unit 3 can be easily mounted to the frame 2. The gas line unit 3 is mounted without using a fixation tool such as a bolt, and hence the work efficiency in mounting the gas line unit 3 to the frame 2 can be improved. Note that, in addition to the case of mounting, also when the gas line unit 3 is detached from the frame 2, the gas line unit 3 can be easily detached, and the work efficiency can be improved.

At the rear end of the upper portion 37, the first inclined surface 37C inclined so as to be away from the device placement portion 31 as it goes downward from the upper end thereof is formed. With this configuration, even when the first horizontal frame member 10 has no so much depth, the line support member 30 can be easily mounted to the first horizontal frame member 10.

In the state in which the bolt fixation portion 33B is not fixed to the second horizontal frame member 20 with the bolts 9, the bolt fixation portion 33B is inclined so as to approach the front as it goes downward. Thus, when the bolt fixation portion 33B is fixed with the bolts 9 so as to abut on the second horizontal frame member 20, a force toward the front acts on the upper portions 37 of the line support member 30. Consequently, the upper portions 37 of the line support member 30 are pressed against the first front portion 15 of the first horizontal frame member 10, and hence the influence of vibration on the gas line unit 3 can be reduced.

By inserting the bolts 9 into the pair of second fixation holes 33c in the bolt fixation portion 33B and the corresponding first fixation holes 22a in the second horizontal frame member 20, the bolt fixation portion 33B is fixed to the second horizontal frame member 20. With this configuration, the influence of vibration on the gas line unit 3 can be reduced.

In mounting the gas line unit 3 to the frame 2, the stepped surface 36D of the stepped portion 36E of the base portion 36 is placed on the top surface 13A of the first lower portion 13 of the first horizontal frame member 10 in the state in which the gas line unit 3 is inclined with respect to the up-down direction. In this manner, most of the weight of the gas line unit 3 can be supported by the first horizontal frame member 10. Thus, the burden of an operator can be reduced, and the work efficiency in attaching and detaching the gas line unit 3 to and from the frame 2 can be improved.

Each first groove 13c of the first lower portion 13 is formed such that the width becomes smaller toward the rear. Thus, the second groove 36a formed in the base portion 36 can be easily fitted into the first groove 13c. The lower part of the second groove 36a formed in the base portion 36 is formed by the second inclined surface 36B that is inclined downward as being apart from the device placement portion 31, and hence can be separated away from the bottom surface 13D of the first lower portion 13. In this manner, the influence of vibration on the gas line unit 3 can be reduced.

The present disclosure is not limited to the above-mentioned embodiments. A person skilled in the art can make various additions and changes within the scope of the present disclosure.

Figure 9:
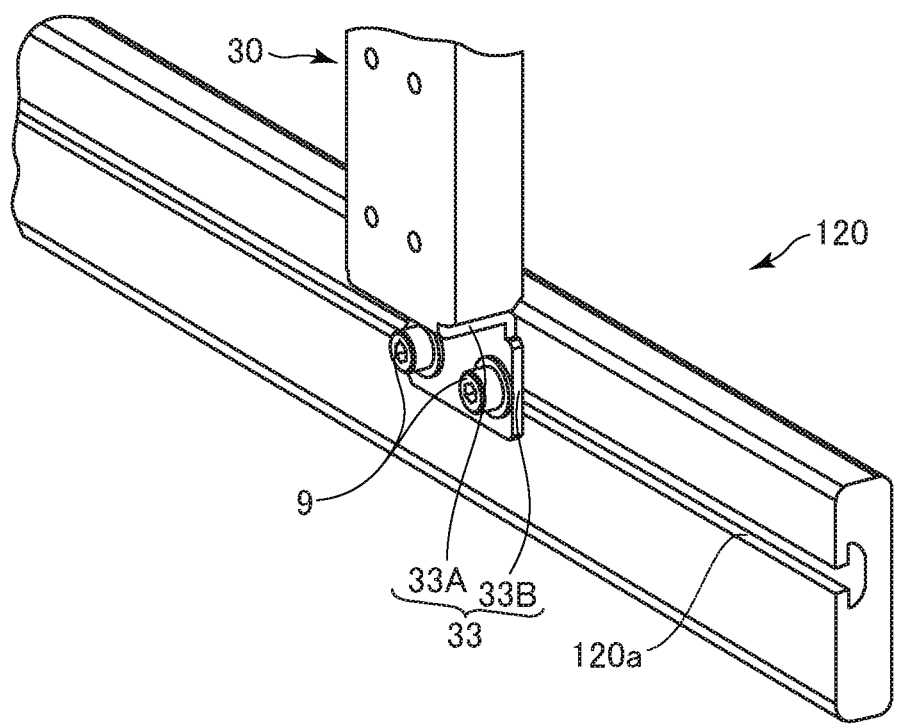
FIG. 9 is a diagram illustrating a modification of the second horizontal frame member.

For example, as illustrated in FIG. 9, a slit 120a extending in the left-right direction may be formed in a second horizontal frame member 120, and by inserting a female screw member (not shown) into the slit 120a, the bolts 9 may be inserted into the pair of second fixation holes 33c and the slit 120a to fix the bolt fixation portion 33B to the second horizontal frame member 120. With this configuration, the bolt fixation portion 33B can be fixed to any position on the second horizontal frame member 120.

The fixation portion 33 of the line support member 30 may be fixed to the second horizontal frame member 20 by using a cover extending in the left-right direction as in the related art. Although the bolt fixation portion 33B is fixed to the second horizontal frame member 20 by two bolts 9, one bolt hole 33c may be formed at a center part of the bolt fixation portion 33B in the left-right direction, and the bolt fixation portion 33B may be fixed to the second horizontal frame member 20 by only one bolt 9. Although the frame 2 is formed from a pair of horizontal frame members and a pair of vertical frame members, the frame 2 may be formed from a pair of horizontal frame members, and each horizontal frame member may be fixed to a vertical wall surface of a casing of a semiconductor manufacturing apparatus.

What is claimed is:

1. A fluid control apparatus, comprising a gas line unit detachably attached to a frame, the gas line unit including a line support member to which a fluid control device is attached,
wherein the frame includes: a first horizontal frame member; and a second horizontal frame member located below the first horizontal frame member,
the first horizontal frame member includes: a hooking member extending in a left-right direction; and a lower portion which is located below the hooking member and in which a plurality of first grooves that are open to front are formed,
the line support member includes: a device placement portion; and a pair of side plate portions protrude rearward from right and left edges of the device placement portion, each of the side plate portions includes: a base portion located below the hooking member; and an upper portion located above the base portion and behind the hooking member, a second groove that is open to rear and fitted into the first groove is formed in the base portion, and the upper portion is provided with a projecting portion that protrudes frontward and abuts on the hooking member from above.

2. The fluid control apparatus according to claim 1, wherein an inclined surface is formed at a rear end of the upper portion, the inclined surface being inclined so as to be away from the device placement portion as the inclined surface goes downward from an upper end thereof.

3. The fluid control apparatus according to claim 1, wherein a bolt fixation portion to be fixed to the second horizontal frame member with a bolt is provided at a lower end of the line support member, and the bolt fixation portion is inclined frontward as the bolt fixation portion goes downward in a state in which the bolt fixation portion is not fixed to the second horizontal frame member with the bolt.

4. The fluid control apparatus according to claim 1, wherein a plurality of first fixation holes arranged in the left-right direction are formed in the second horizontal frame member, a bolt fixation portion in which a second fixation hole is formed is provided at a lower end of the line support member, and a bolt inserts into the second fixation hole and a corresponding one of the first fixation holes, the bolt fixation portion is fixed to the second horizontal frame member.

5. The fluid control apparatus according to claim 1, wherein a slit that extends in the left-right direction and is open to the front is formed in the second horizontal frame member, a bolt fixation portion in which a second fixation hole is formed is provided at a lower end of the line support member, and a bolt inserts into the second fixation hole and the slit, the bolt fixation portion is fixed to the second horizontal frame member.

6. A method for attaching and detaching a gas line unit to and from a frame, the frame including: a first horizontal frame member; and a second horizontal frame member located below the first horizontal frame member, the first horizontal frame member including: a hooking member extending in a left-right direction; and a lower portion which is located below the hooking member and in which a plurality of first grooves that are open to front are formed, the gas line unit including a line support member including: a device placement portion to which a fluid control device is attached; and a pair of side plate portions protruding rearward from right and left edges of the device placement portion, each of the side plate portions including: a base portion; and an upper portion located above the base portion, a second groove that is open to rear being formed in the base portion, the upper portion being provided with a projecting portion that protrudes frontward, the method comprising:

fitting, in a state in which the gas line unit is inclined with respect to an up-down direction, the second groove of each of the base portions of the line support member into the first groove of the lower portion of the first horizontal frame member, and locating the upper portion at a position behind the hooking member; and rotating the gas line unit about the second groove such that the upper portion approaches the front, bringing the projecting portion of the upper portion into abutment on the hooking member of the first horizontal frame member from above, and hanging the gas line unit from the first horizontal frame member.

7. The method for attaching and detaching a gas line unit according to claim 6, wherein a stepped portion having a stepped surface facing downward is provided between the upper portion and the second groove, and the method comprises:

placing, in the state in which the gas line unit is inclined with respect to the up-down direction, the stepped surface of the stepped portion onto a top surface of the lower portion of the first horizontal frame member; and moving the gas line unit obliquely upward to fit the second groove of each of the base portions of the line support member into the first groove of the lower portion of the first horizontal frame member.

* * * * *